US007250001B2

(12) United States Patent
Baerlocher et al.

(10) Patent No.: US 7,250,001 B2
(45) **Date of Patent: *Jul. 31, 2007**

(54) GAMING DEVICE HAVING SEPARATELY CHANGEABLE VALUE AND MODIFIER BONUS SCHEME

(75) Inventors: Anthony J. Baerlocher, Reno, NV (US); Peter Gerrard, Manchester (GB)

(73) Assignee: IGT, Reno, NV (US)

( * ) Notice: Subject to any disclaimer, the term of this patent is extended or adjusted under 35 U.S.C. 154(b) by 723 days.

This patent is subject to a terminal disclaimer.

(21) Appl. No.: 10/767,484

(22) Filed: Jan. 28, 2004

(65) Prior Publication Data

US 2004/0185928 A1 Sep. 23, 2004

Related U.S. Application Data

(63) Continuation of application No. 10/410,019, filed on Apr. 8, 2003, now Pat. No. 6,692,355, which is a continuation of application No. 09/626,045, filed on Jul. 27, 2000, now Pat. No. 6,569,015.

(51) Int. Cl.
*G06F 17/00* (2006.01)
*G06F 19/00* (2006.01)

(52) U.S. Cl. ............................ 463/16; 463/20; 463/25; 273/143 R

(58) Field of Classification Search .................... 463/1, 463/16–21, 25, 29–31, 36, 37; 273/138.1, 273/139, 143 R
See application file for complete search history.

(56) References Cited

U.S. PATENT DOCUMENTS 3,633,915 A 1/1972 Lippert
4,448,419 A 5/1984 Telnaes
4,582,324 A 4/1986 Koza et al.
4,624,459 A 11/1986 Kaufman
4,695,053 A 9/1987 Vazquez, Jr. et al.

(Continued)

FOREIGN PATENT DOCUMENTS

EP 0874337 A1 10/1998

(Continued)

OTHER PUBLICATIONS

Treasure Wheel/Treasure Tunnel Brochure published by Sigma Game, Inc.

(Continued)

*Primary Examiner*—Scott Jones
*Assistant Examiner*—Milap Shah
(74) *Attorney, Agent, or Firm*—Bell, Boyd & Lloyd LLP

(57) ABSTRACT

The apparatus and method of the present invention provides a gaming device having a separately changeable value and multiplier bonus scheme. The bonus scheme begins when a triggering event occurs during normal operation of the gaming device. Initially, the game displays a value and a multiplier to the player, which form an offer. The game enables the player to keep the offer or change either the value or the multiplier. If the player changes either, the game changes the value or multiplier selected by the player, and yields a new offer. In the preferred embodiment of the bonus scheme, the player can keep the new offer or change the value or multiplier and obtain a final new offer. After the player can no longer change the value or multiplier or if at any time the player keeps an offer, the bonus scheme ends by adding the amount of the offer to the player's gaming device credit, and the player resumes normal play.

30 Claims, 6 Drawing Sheets

U.S. PATENT DOCUMENTS 4,991,848 A 2/1991 Greenwood et al.
5,178,390 A 1/1993 Okada
5,205,555 A 4/1993 Hamano
5,342,047 A 8/1994 Heidel et al.
5,382,023 A 1/1995 Roberts et al.
5,456,465 A 10/1995 Durham
5,511,781 A * 4/1996 Wood et al. .................. 463/13
5,524,888 A 6/1996 Heidel
5,536,016 A 7/1996 Thompson
5,542,669 A 8/1996 Charron et al.
5,560,603 A 10/1996 Seelig et al.
5,584,763 A 12/1996 Kelly et al.
5,611,535 A 3/1997 Tiberio
5,711,525 A 1/1998 Breeding
5,769,716 A 6/1998 Saffari et al.
5,772,509 A 6/1998 Weiss
5,775,692 A 7/1998 Watts et al.
5,788,573 A 8/1998 Baerlocher et al.
5,823,874 A 10/1998 Weiss
5,833,538 A 11/1998 Weiss
5,848,932 A 12/1998 Adams
5,851,147 A 12/1998 Stupak et al.
5,851,148 A 12/1998 Brune et al.
5,873,781 A 2/1999 Keane
5,882,261 A 3/1999 Adams
5,902,184 A 5/1999 Bennett et al.
5,911,418 A 6/1999 Adams
5,947,820 A 9/1999 Morro et al.
5,951,397 A 9/1999 Dickinson
5,964,463 A 10/1999 Moore, Jr.
5,967,894 A 10/1999 Kinoshita et al.
5,980,384 A 11/1999 Barrie
5,984,781 A 11/1999 Sunaga
5,997,400 A 12/1999 Seelig et al.
5,997,401 A 12/1999 Crawford
6,004,207 A 12/1999 Wilson, Jr. et al.
6,015,346 A 1/2000 Bennett
6,019,369 A 2/2000 Nakagawa et al.
6,033,307 A 3/2000 Vancura
6,056,642 A 5/2000 Bennett
6,059,289 A 5/2000 Vancura
6,059,658 A 5/2000 Mangano et al.
6,062,980 A 5/2000 Luciano
6,068,552 A 5/2000 Walker et al.
6,089,976 A 7/2000 Schneider et al.
6,089,977 A 7/2000 Bennett
6,089,978 A 7/2000 Adams
6,093,102 A 7/2000 Bennett
6,102,798 A 8/2000 Bennett
6,120,031 A 9/2000 Adams
6,126,541 A 10/2000 Fuchs
6,126,542 A 10/2000 Fier
6,142,873 A 11/2000 Weiss et al.
6,142,874 A 11/2000 Kodachi et al.
6,142,875 A 11/2000 Kodachi et al.
6,146,270 A 11/2000 Huard et al.
6,146,273 A 11/2000 Olsen
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,168,520 B1 1/2001 Baerlocher et al.
6,168,523 B1 1/2001 Piechowiak et al.
6,173,955 B1 1/2001 Perrie et al.
6,174,233 B1 1/2001 Sunaga et al.
6,174,235 B1 1/2001 Walker et al.
6,190,254 B1 2/2001 Bennett
6,190,255 B1 2/2001 Thomas et al.
6,203,429 B1 3/2001 Demar et al.
6,210,279 B1 4/2001 Dickinson
6,213,876 B1 4/2001 Moore, Jr.
6,224,483 B1 5/2001 Mayeroff
6,231,442 B1 5/2001 Mayeroff
6,231,445 B1 5/2001 Acres
6,261,177 B1 7/2001 Bennett
6,302,790 B1 10/2001 Brossard
6,305,686 B1 10/2001 Perrie et al.
6,309,300 B1 10/2001 Glavich
6,328,649 B1 12/2001 Randall et al.
6,375,187 B1 4/2002 Baerlocher
2004/0185928 A1 9/2004 Baerlocher et al.

FOREIGN PATENT DOCUMENTS

EP 0926645 A2 6/1999
EP 0944030 A2 9/1999
EP 0945837 A2 9/1999
EP 0981119 A2 2/2000
EP 0984408 A2 3/2000
EP 0984409 A2 3/2000
WO WO 9732285 9/1997
WO WO 00/12186 3/2000

OTHER PUBLICATIONS

Wagner et al., Human Factors Design Guide, DOA/FAA/CT-96/1, U.S. Department of Transportation (Jan. 15, 1996), §7.2.1.1-7.2.1.3, 7.2.8.6, 8.2.4.
Wheel of Fortune Advertisement written by IGT, published in 1998.
Wheel of Fortune advertisement written by IGT, published in 1999.
Wheel Poker Article written by Strictly Slots (Anchor Games), published in Nov. 2000.
Winning Streak Web Site Description written by WMS Gaming, Inc. (web site), printed on Mar. 21, 2000.
X Factor Brochure and Website Page published by WMS Gaming, Inc. in 1998.
Addams Family Advertisement and Article written by IGT, Strictly Slots, published in 2000.
Adders and Ladders Advertisement written by Barcrest Ltd., published prior to 2000.
American Thunder Screen Slots published by IGT in 1998.
Big Bang Piggy Bankin Advertisement written by WMS Gaming, Inc., published prior to 2000.
Blackjack/Twenty-One Description written by Hoyle's Rules of Games, published in 1993.
Bonus Spin Red, White & Blue Advertisement written by IGT, published in 2000.
Bonus Times Article published by Bally Gaming in 2000.
By George written by IGT, published in 2002.
Caribbean Gold II Advertisement written by Aristocrat Incorporated, published in 1998.
Cash Box advertisement & Article written by Anchor Games, Strictly Slots, published in 2000.
Chutes & Ladders Game Instructions written by Hasbro-Milton Bradley, published in 1999.
Description of Let's Make A Deal Television Show written by letsmakeadeal.com (2 pages), printed on Mar. 16, 2001.
Double Diamond Game Descriptions written by IGT printed on Mar. 21, 2001.
Double Up Poker Game Description written by IGT Undated.
Easy Street Advertisements and Articles written by Casino Data Systems, published in 2000.
Elvis Advertisement written by IGT, published in 1999.
Empire Game Advertisement written by AC Coin, published in 1996.
Fire and Fortune Article written by Strictly Slots, published in 2001.
Fox "N" Hound Advertisement written by IGT, published in 2000.
In Between Game Description written by IGT, available prior to 2000.
Jackpot Party Advertisements and Articles written by WMS Gaming, Inc., published in 1998.
Keep Your Hat On Advertisement written by Aristocrat, published in 2001.

Let's Make A Deal written by geocities.com (10 pages), printed on Mar. 21, 2001.
Let's Make a Deal written by fortunecity.com (4 pages), printed on Mar. 21, 2001.
Let's Make a Deal written by Illinoislottery.com (1 page), printed on Mar. 21, 2001.
Let's Make a Deal geocities.com (2 pages), printed on Mar. 16, 2001.
Let's Make A Deal Advertisement written by Shuffle Master and IGT, published in 2001.
Let's Make A Deal Game Advertisement written by Bally Gaming Systems, published in 1999.
Little Green Men Adverstisement and Article written by IGT, Strictly Slots, published in 2000.
Megalackpots Advertisement written by IGT, published in 1998.
Money Grab Article written by Strictly Slots, published in Arp. 2001.
Money in the Bank Advertisement written by Strictly Slots Konami, published in 2001.
Monopoly Advertisement and Articles written by WMS Gaming, Inc. Strictly Slots, published in 1998, 1999, 2000.
Monopoly Party Train Article written by Strictly Slots, published in 2002.
Neon Nights written by IGT, published in 2000.
On the Money Article written by Strictly Slots, Casino Data Systems, published in Dec. 2000.
Polly and Roger Brochure published by VLC, Inc. in 2000.
Price is Right "Cliff Hangers" Description written by www. geocities.com, members.aol.com (web site), printed Mar. 21, 2001.
Price is Right "Showcases" Description written by schuminweb. com (web site), printed Mar. 16, 2001.
Psycho Cash Beast Club (including knockouts) written by Barcrest, published prior to 1998.
Richard Petty Advertisement written by IGT, published in 2000.
South Park—Dodgeball Advertisement written by IGT, published in 2000.
Spell Binder Adverstisement written by IGT, published in 2000.
Sphinx Adverstisement written by Atronic Casino Technology, Ltd., published in 1997.
Take Your Pick Article written by Strictly Slots, published in Mar. 2001.
Take Your Pick Advertisement written by IGT/Anchor Gaming, published in 1999.
The Deals of Let's Make a Deal written by fortunecity.com (2 pages), printed on Mar. 16, 2001.
The Official Let's Make a Deal Website written by Bally Gaming System Website, printed on Mar. 16, 2001.
Top Cat Brochure published by WMS Gaming, Inc.
Top Dollar Brochure, published by IGT in 1998.
Totem Pole Advertisement written by IGT, published in 1997.

* cited by examiner

GAMING DEVICE HAVING SEPARATELY CHANGEABLE VALUE AND MODIFIER BONUS SCHEME

PRIORITY CLAIM

This application is a continuation of and claims the benefit of and priority to U.S. patent application Ser. No. 10/410,019, filed Apr. 8, 2003 now U.S. Pat. No. 6,692,355, which is a continuation of and claims priority to U.S. patent application Ser. No. 09/626,045, filed Jul. 27, 2000, now U.S. Pat. No. 6,569,015.

CROSS-REFERENCE TO RELATED APPLICATIONS

This application is related to the following commonly-owned co-pending patent applications: "GAMING DEVICE HAVING AN AWARD EXCHANGE BONUS ROUND AND METHOD FOR REVEALING AWARD EXCHANGE POSSIBILITIES," Ser. No. 09/689,510, "GAMING DEVICE HAVING GRADUATING AWARD EXCHANGE SEQUENCE WITH A TEASE CONSOLATION SEQUENCE AND AN INITIAL QUALIFYING SEQUENCE," Ser. No. 09/680,601, "GAMING DEVICE HAVING A DESTINATION PURSUIT BONUS SCHEME WITH ADVANCED AND SETBACK CONDITIONS," Ser. No. 10/288,750, "GAMING DEVICE HAVING A DESTINATION PURSUIT BONUS SCHEME WITH ADVANCED AND SETBACK CONDITIONS," Ser. No. 10/393,201, "GAMING DEVICE HAVING A DESTINATION PURSUIT BONUS SCHEME WITH ADVANCED AND SETBACK CONDITIONS," Ser. No. 10/660,075, "GAMING DEVICE HAVING VALUE SELECTION BONUS," Ser. No. 10/306,295, "GAMING DEVICE HAVING VALUE SELECTION BONUS," Ser. No. 10/354,514, "GAMING DEVICE HAVING RISK EVALUATION BONUS ROUND," Ser. No. 10/454,337, "GAMING DEVICE HAVING RISK EVALUATION BONUS ROUND," Ser. No. 10/616,563, "GAMING DEVICE HAVING AN IMPROVED OFFER/ACCEPTANCE BONUS SCHEME," Ser. No. 09/966,884, "GAMING DEVICE HAVING IMPROVED OFFER AND ACCEPTANCE BONUS SCHEME," Ser. No. 10/074,273, "GAMING DEVICE HAVING AN OFFER/ACCEPTANCE GAME WHEREIN EACH OFFER IS BASED ON A PLURALITY OF INDEPENDENTLY GENERATED EVENTS," Ser. No. 10/244,134, "GAMING DEVICE HAVING IMPROVED AWARD OFFER BONUS SCHEME," Ser. No. 10/290,800, "GAMING DEVICE HAVING IMPROVED AWARD OFFER BONUS SCHEME," Ser. No. 10/318,752, "GAMING DEVICE HAVING OFFER AND ACCEPTANCE GAME WITH HIDDEN OFFER," Ser. No. 10/160,688, "GAMING DEVICE HAVING OFFER ACCEPTANCE GAME WITH TERMINATION LIMIT," Ser. No. 10/678,656, "GAMING DEVICE HAVING OFFER/ACCEPTANCE ADVANCE THRESHOLD AND LIMIT BONUS SCHEME," Ser. No. 09/838,014, "GAMING DEVICE HAVING IMPROVED OFFER AND ACCEPTANCE GAME WITH MASKED OFFERS," Ser. No. 10/086,014, "GAMING DEVICE HAVING AN OFFER AND ACCEPTANCE SELECTION BONUS SCHEME WITH A TERMINATOR AND AN ANTI-TERMINATOR," Ser. No. 10/644,447, "GAMING DEVICE HAVING AN AWARD OFFER AND TERMINATION BONUS SCHEME," Ser. No. 09/682,428, "GAMING DEVICE HAVING AN OFFER AND ACCEPTANCE GAME WITH A PLAYER SELECTION FEATURE," Ser. No. 10/086,078, "GAMING DEVICE HAVING OFFER AND ACCEPTANCE GAME WITH A PLURALITY OF AWARD POOLS, A REVEAL FEATURE, AND A MODIFY FEATURE," Ser. No. 10/255,862, and "GAMING DEVICE HAVING AN OFFER/ACCEPTANCE GAME WITH MULTI-OFFER SYMBOL," Ser. No. 10/245,387,

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device and in particular to a gaming device having a separately changeable value and modifier bonus scheme that increases player excitement and enjoyment.

BACKGROUND OF THE INVENTION

Gaming machines currently exist with bonus schemes in which the player has two or more opportunities to completely accept or reject an offered bonus value. With each offer (prior to the last offer), if the player accepts the offered bonus value, the player is credited with the value. If the player rejects the offered bonus value, the player is provided with another offer which the player can completely accept or reject. Each subsequent offer may be higher, lower or equal to the previous offers. If the offer is the final offer, the player is awarded the final offer.

One such game having a bonus scheme for allowing players to accept or decline multiple award offers is named TOP DOLLAR™ which is manufactured and distributed by International Game Technology, the assignee of this application. The player plays the primary game until reaching the bonus round. The bonus credit or amount which is ultimately awarded to the player depends upon certain values generated by the bonus scheme and the player's selection of those values.

Specifically, the TOP DOLLAR™ game bonus round includes a screen showing multiple dollar bill images. The images include varying numeric values such as "5 coins," "20 coins," "50 coins," and "100 coins." The bonus round provides the player with three offers and a final award. The game illuminates one or more particular images corresponding to each offer made. The offer amount is equal to the sum of the numeric values appearing on the illuminated images.

When an offer is given, the player may completely accept or reject it by pushing an accept button or indicator or a reject button or indicator, respectively. If the player accepts an offer, the player receives the accepted bonus amount and the bonus round terminates. If the player declines an offer, the game generates another offer for the player. If the player declines all three offers, the game generates a final award and the bonus round terminates. No matter how the bonus round terminates, the player will receive an award, the amount depending upon the particular offer and the player's selection of such offer.

SUMMARY OF THE INVENTION

The apparatus and method of the present invention provides a gaming device having a separately changeable value and modifier bonus scheme. In one preferred embodiment, the modifier is a multiplier. The bonus scheme begins when a triggering event occurs during normal operation of the gaming device. Initially, the game displays a value and a multiplier to the player, which form an offer. The game enables the player to keep the offer or change either the value or the multiplier. If the player changes either, the game changes the value or multiplier selected by the player, and yields a new offer. In the preferred embodiment of the bonus scheme, the player can keep the new offer or change the previously unaltered value or multiplier and obtain a new offer. After the player can no longer change the value or multiplier or if at any time the player keeps an offer, the bonus scheme ends by adding the amount of the offer to the player's gaming device credit, and the player resumes normal play.

The triggering event could consist of mechanical or simulated reels, simulated cards, or some other form of gaming device. In an illustrative embodiment, a combination of indicia from each of a number of reels triggers the bonus round if the combination matches a combination programmed into the gaming device.

In one embodiment, the game displays the value and multiplier via spinning wheels, wherein one wheel has a plurality of values and one wheel has a plurality of multipliers. When the wheels stop spinning, one or more indicators point to the selected value and selected multiplier. The game calculates and displays the current offer to the player.

In a second embodiment, the bonus scheme indicates the value and multiplier via displays, wherein one display has a plurality of values and one display has a plurality of multipliers. The displays of this embodiment illuminate different values and multipliers randomly and sequentially until ending the sequence on the chosen value and multiplier.

Although the preferred embodiment only allows the player to change the value and the multiplier one at a time, the bonus scheme could allow for both values to be changed at the same time. Further, the mathematical equation described above is a multiplication of the value and multiplier. Alternatively, in the bonus scheme, the offer could be calculated by adding, subtracting, or dividing the value with a modifier, as opposed to a multiplier.

It is therefore an object of the present invention to provide a gaming device having a bonus scheme which provides the player with an offer formed from a separately changeable value and modifier.

Other objects, features and advantages of the invention will be apparent from the following detailed disclosure, taken in conjunction with the accompanying sheets of drawings, wherein like numerals refer to like parts, elements, components, steps, and processes.

DETAILED DESCRIPTION OF THE INVENTION

Gaming Device and Electronics

Figure 1:
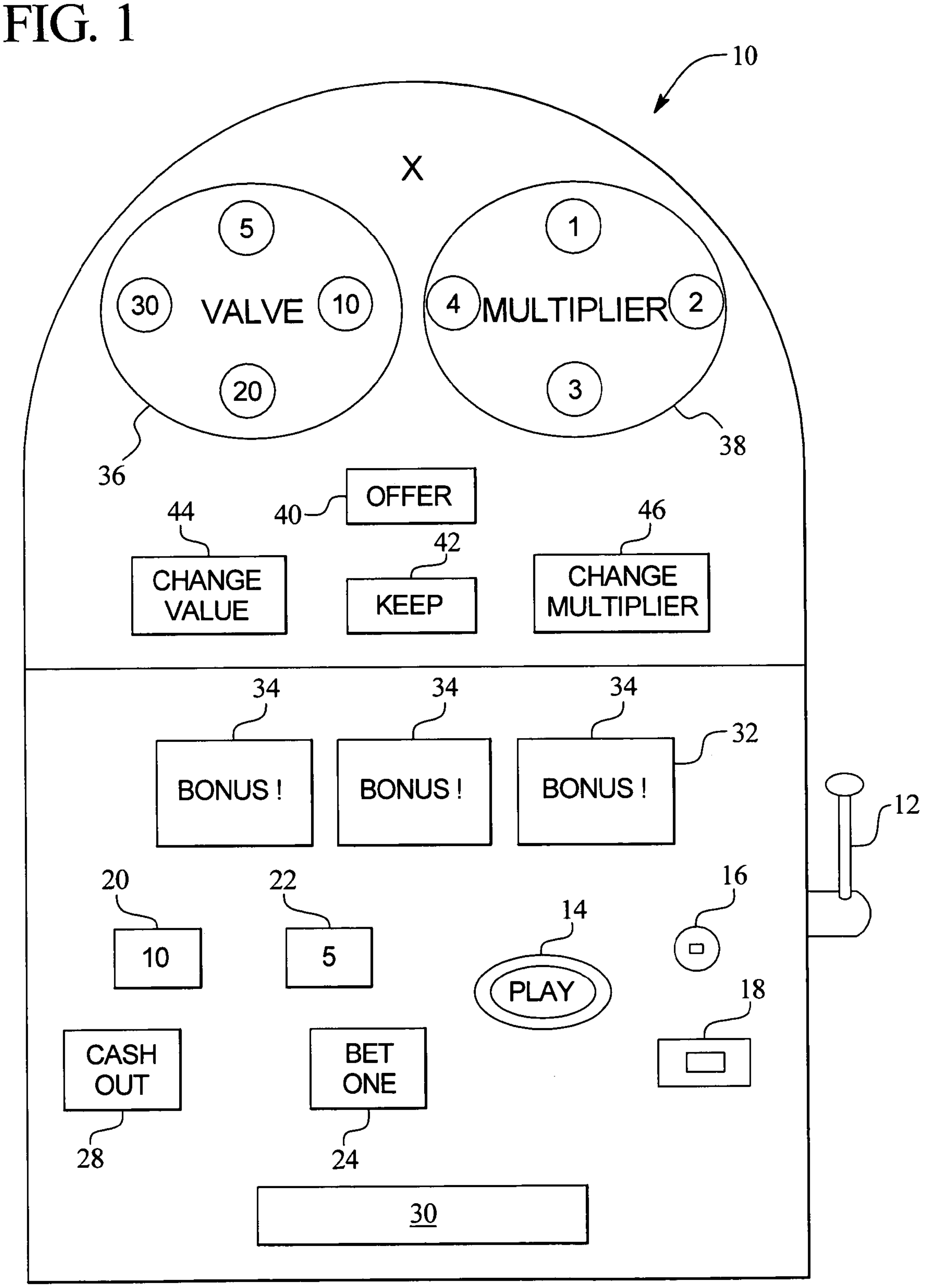
FIG. 1 is a front elevational view of a gaming device or slot machine having the separately changeable value and multiplier bonus scheme of the present invention.

Referring now to the drawings, FIG. 1 illustrates a gaming device commonly referred to as a slot machine, which incorporates the separately changeable value and multiplier bonus scheme of the present invention. Thus, slot machine 10 generally includes hardware and software necessary to operate the gaming device in accordance with the apparatus and methods of the present invention. The main hardware components of the slot machine include: a frame, a set of three, four or five reels, numerous buttons electrically connected to different electronic and electromechanical components, a place to insert money, a place to retrieve money, an arm to set the reels in motion, a controller to house software and control other components, and the necessary electronics to power and electrically link the components. The software stores the outcomes for the millions of combinations of indicia produced by the reels and controls the sequence of operation of the slot machine, including the machine's bonus scheme.

A player may play the slot machine 10 by pulling an arm 12 or by pushing a play button 14. The player operates the slot machine 10 by placing coins in the coin slot 16 or paper money in the bill acceptor 18. Other devices for accepting payment such as readers or validators for credit cards of debt cards could be used. When a player puts money in the slot machine 10, a number of credits corresponding to the amount deposited is shown in a credit display 20.

The slot machine 10 also includes a bet display 22 and a bet one button 24. The player places a bet by pushing the bet one button 24 and increases the bet by one credit each time the player pushes the bet one button 24. When the player pushes the bet one button 24, the number of credits shown in the credit display 20 decreases by one, and the number of credits shown in the bet display 22 increases by one.

The slot machine 10 has a payout display 32 that contains a plurality of reels 34. Slot machines commonly employ three to five reels that are either mechanical or simulated. Each reel has a plurality of indicia such as bells, hearts, fruits, numbers, letters, bars, etc. that preferably correspond to a theme associated with the slot machine 10. When the player pulls the arm 12 or pushes the play button 14, the reels 34 begin to spin. The reels spin until the controller of the slot machine 10 halts the reels individually or in any combination programmed into the controller. When all the reels stop spinning, the combination of indicia from each reel triggers a bonus round if the combination matches a combination programmed into the controller. FIG. 1 illustrates a possible triggering combination wherein all the reels of the payout display 32 show indicia containing the word "BONUS." It should be appreciated that any combination of indicia could be programmed into the controller of the slot machine 10 to trigger the bonus round.

A player may "cash out" and thereby receive a number of coins corresponding to the number of credits at any time by pushing a cash out button 28. When the player "cashes out," the player receives the coins in a coin payout tray 30. The slot machine 10 may employ other payout mechanisms such as credit slips redeemable by a cashier or electronically recordable cards that keep tract of the player's credits. It should also be appreciated that while the bonus scheme of the present invention will be described for use with a slot machine, other gaming devices such as a video card game could employ the bonus scheme of the present invention.

Bonus Scheme Components and Electronics

The bonus scheme of the present invention preferably includes a controller of the slot machine 10, a value display 36, a multiplier display 38, an offer display 40, a keep offer button or indicator 42, a change value button or indicator 44, and a change multiplier button or indicator 46. The slot machine 10 preferably has electronic components generally illustrated in FIG. 6, which includes: a processor 15; a memory device 17 for storing program code or other data; a video monitor such as video monitor 32 or a cathode ray tube ("CRT") or a liquid crystal display ("LCD") for displaying items such as the value, the multiplier and the offer; and at least one input device such as the play button 14, the keep offer button or indicator 42, the change value button or indicator 44, and the change multiplier button or indicator 46. The processor 15 is preferably a microprocessor or microcontroller-based platform which is capable of displaying images, symbols and other indicia such as images of people, characters, places, things and faces of cards.

The processor 15 can control the coin slot 16 and the bill acceptor 18 and be programmed to require the player to deposit a certain amount of money to start the game. The memory device 17 typically includes random access memory ("RAM") 21 for storing event data or other data generated or used during a particular game. The memory device 17 can also include read only memory ("ROM") 23 to store program code so that slot machine 10 plays a particular game in accordance with applicable game rules and pay tables.

Figure 6:
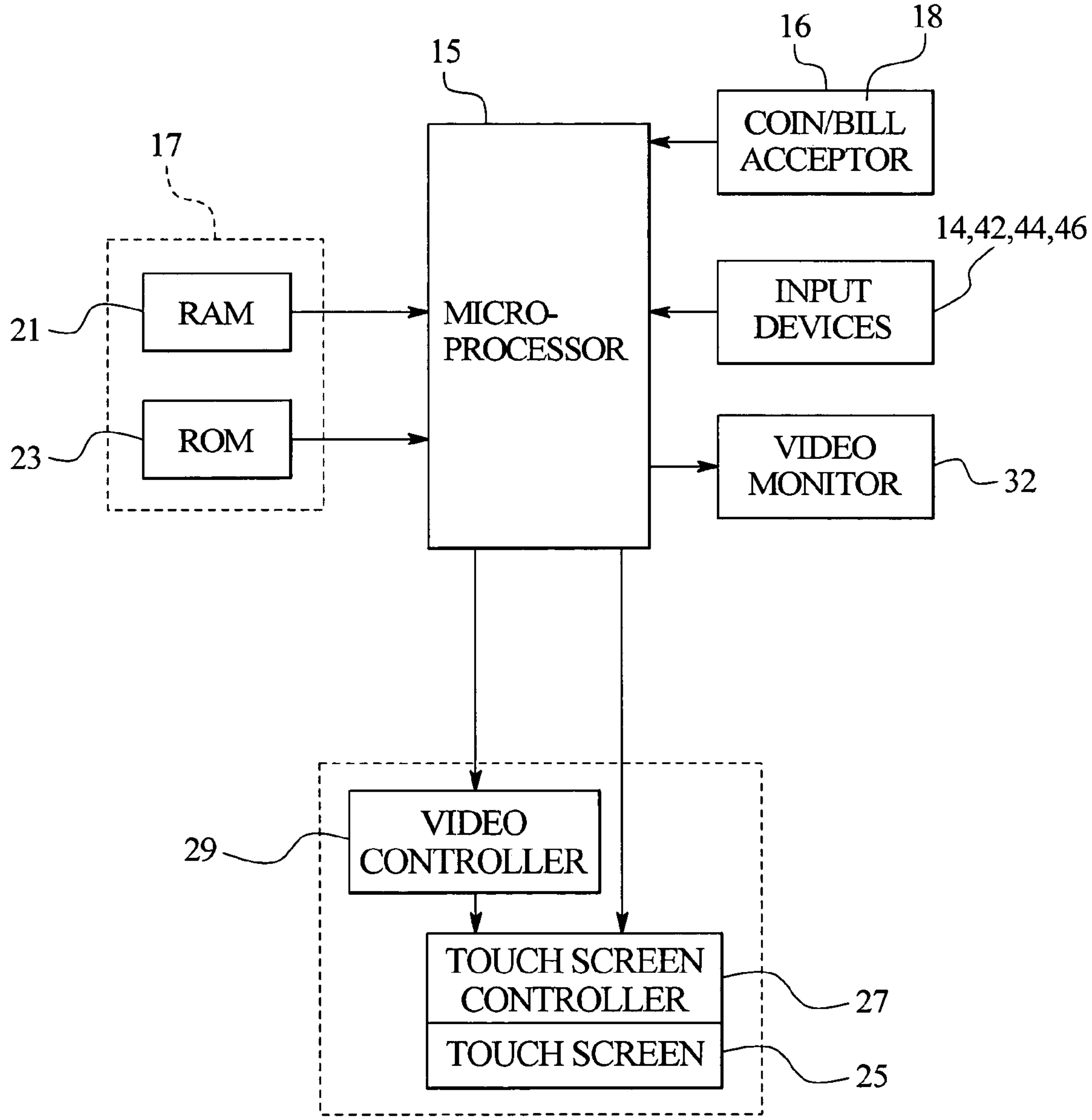
FIG. 6 is a schematic diagram of the controller of the present invention.

As further illustrated in FIG. 6, the player can use the buttons 14, 42, 44, and 46 to input signals into the gaming device 10. However, it is preferable that a touch screen 25 and an associated touch screen controller 27 are used instead of a conventional video monitor. The touch screen 25 and the touch screen controller 27 are connected to a video controller 29 and the processor 15. The player can thus make decisions and input signals into the gaming device 10 by touching the touch screen 25 at appropriate places for activating the reels, changing the value or the multiplier, or keeping the offer.

It should be appreciated that although the processor 15 and the memory device 17 are preferable implementations of the present invention, the present invention can also be implemented using one or more application-specific integrated circuits ("ASIC's") or other hard-wired devices, or using mechanical devices. Furthermore, although the processor 15 and memory device 17 preferably reside on each slot machine 10, it is possible to provide some or all of their functions at a central location such as a network server for communication to a playing station such as over a local area network ("LAN"), wide area network ("WAN"), Internet connection, microwave link, and the like.

Figure 2:
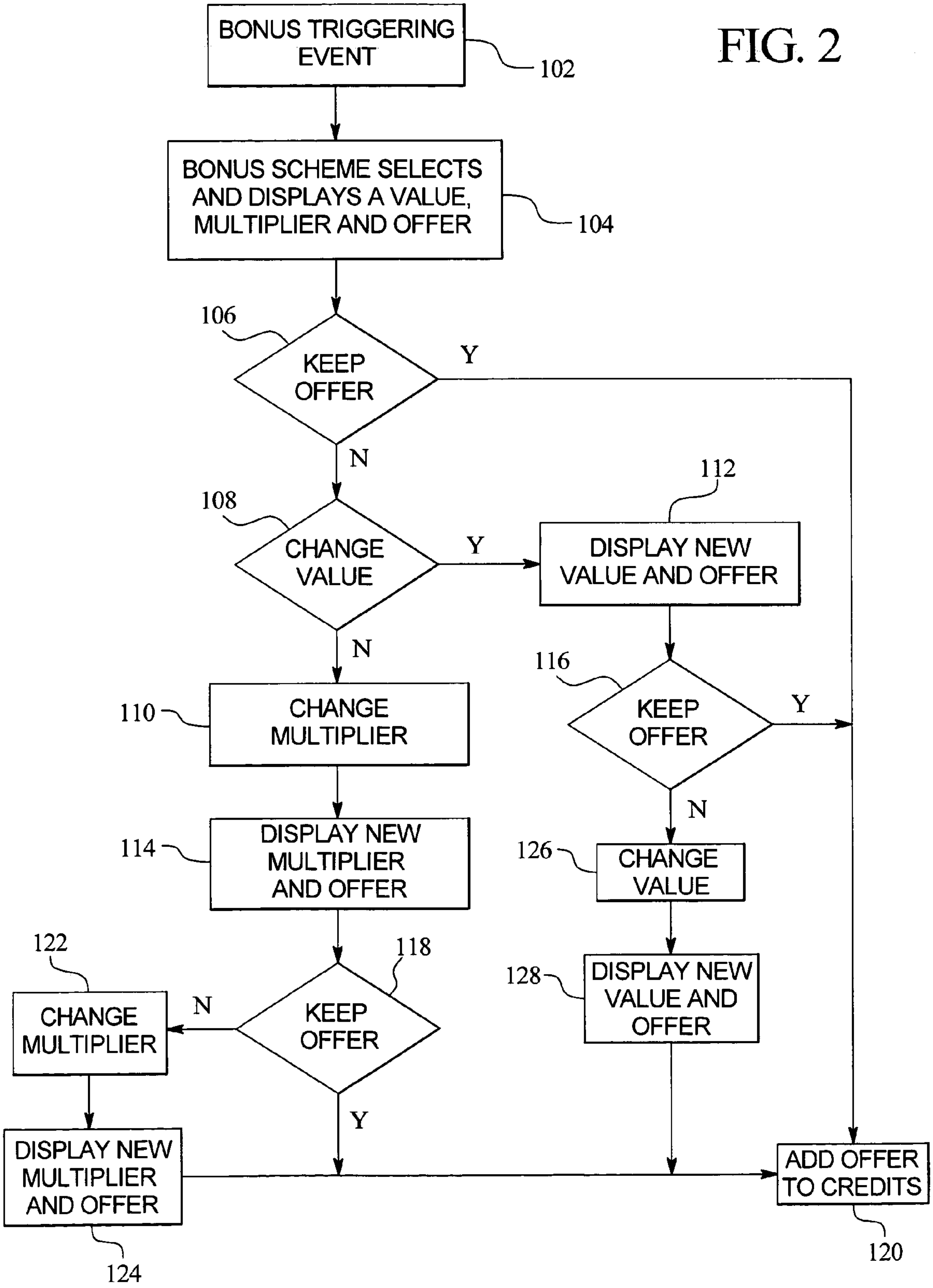
FIG. 2 is a flow diagram of the preferred embodiment of the bonus scheme sequence of the present invention.

FIG. 2 illustrates the preferred embodiment of the sequence of the present invention. Upon a bonus round triggering event 102 indicated by block 102, the game selects and displays a value, a multiplier and an offer to the player as indicated by block 104. The game may display the value, multiplier, and offer by illuminating the selected value and selected multiplier, or by any other suitable method (including a digital display of the value and a digital display of the multiplier). The offer represents a number of credits offered to the player. As will be discussed, the bonus scheme may employ different mathematical functions, but preferably, the offer is the value multiplied by the multiplier.

The player can initially keep the offer as indicated by diamond 106, change the value as indicated by diamond 108 (by pushing the change value button 44) or change the multiplier as indicated by block 110 (by pushing the change multiplier button 46). If the player chooses to change the value, the game determines and displays a new value, performs the appropriate mathematical function to determine a new offer, and displays the new offer as indicated by block 112. The game may display the new value by illuminating the value or by any other suitable method. If the player chooses to change the multiplier as indicated by block 110, the bonus scheme determines and displays a new multiplier, performs the appropriate mathematical function to determine a new offer, and displays the new offer as indicated by block 114. The game may display the new multiplier by illuminating the multiplier or by any other suitable method. When the bonus scheme displays a new offer as indicated by blocks 104, 112 and 114, the player may elect to keep the offer as indicated by diamonds 106, 116 and 118, respectively. When the player keeps the offer as indicated by blocks 106, 116, 118, the game adds the current offer amount to the player's credits, as indicated by block 120, and updates the total number of credits in the credit display 20 illustrated in FIG. 1.

In any bonus round of the present invention, the bonus scheme preferably only allows the user to change the value or the multiplier, although it should be appreciated that the bonus scheme could allow the user to change both the value, and the multiplier in a single bonus round. Thus, in the preferred embodiment, after the game displays a new multiplier and a new offer as indicated by block 114, the player's only options are to keep the offer as indicated by diamond 118 or to again change the multiplier as indicated by block 122. If the player chooses to change the multiplier as indicated by block 122, the game determines and displays a new multiplier, performs the appropriate mathematical function to determine a new offer, and displays the new offer as indicated by block 124. At this point in the preferred embodiment, the player has exercised all the player's options, and the game adds the current offer amount to the player's credits as indicated by block 120 and updates the total number of credits in the credit display 20 illustrated in FIG. 1.

Likewise, after the bonus scheme displays a new value and a new offer as indicated by block 112, the player's only options are to keep the offer as indicated by diamond 116 or to again change the value as indicated by block 126. If the player chooses to change the value as indicated by block 126, the game determines and displays a new value, performs the appropriate mathematical function to determine a new offer, and displays the new offer as indicated by block 128. At this point in the preferred embodiment, the player has exercised all the player's options, and the bonus scheme adds the current offer amount to the player's credits as indicated by block 120, and updates the total number of credits in the credit display 20 illustrated in FIG. 1.

Figure 3:
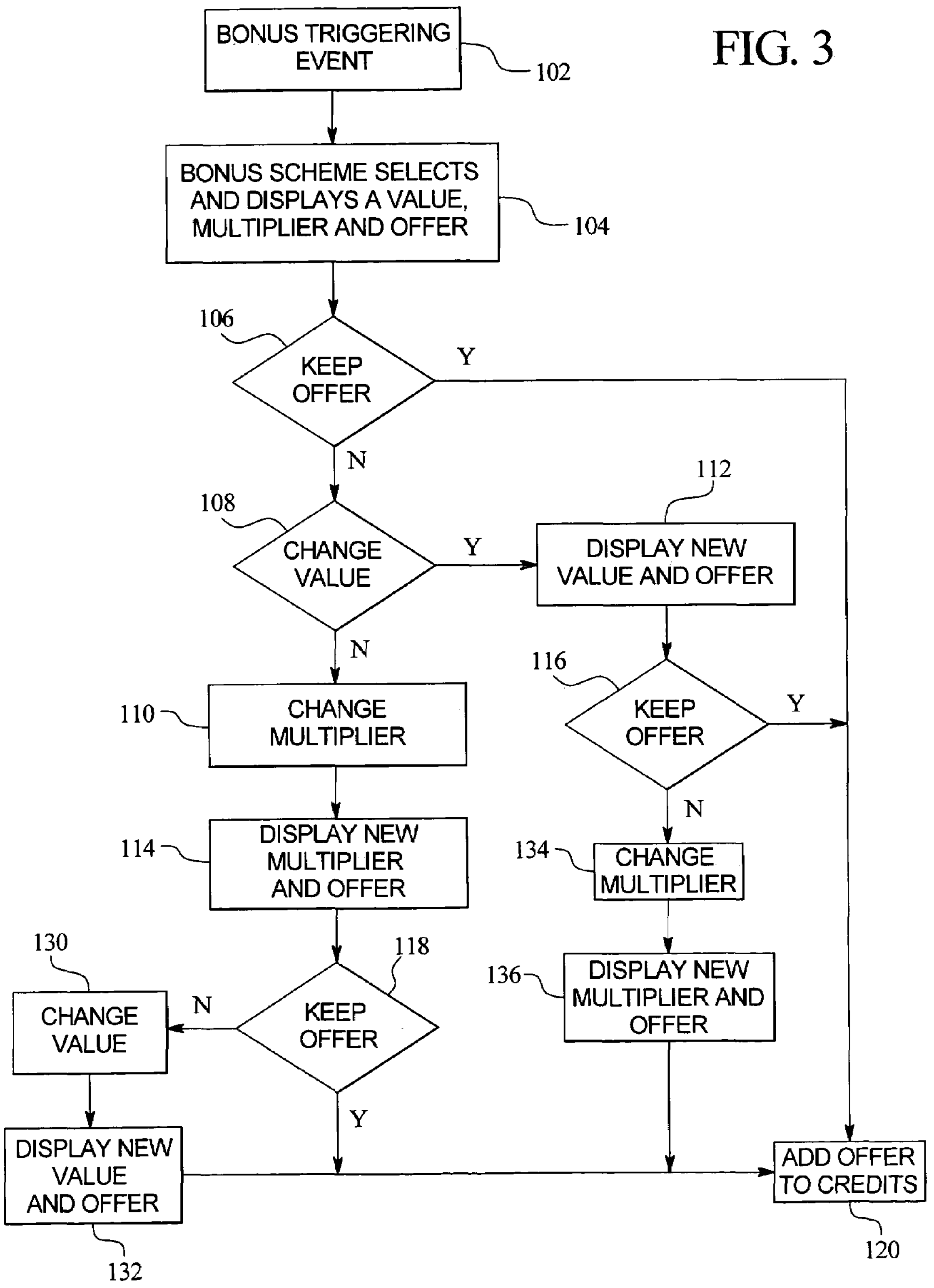
FIG. 3 is a flow diagram of an alternative embodiment of the bonus scheme sequence.

FIG. 3 illustrates an alternative embodiment of the sequence of the present invention. The alternative embodiment mirrors the preferred embodiment until the bonus scheme presents the player with a second opportunity to keep the offer, indicated by diamonds 116 and 118, or decide to play for a higher offer. In this embodiment, the game enables the player to select the component of the offer that the player did not previously select. For example, in FIG. 2 after the player changes the multiplier in block 110, the player may keep the offer as indicated in diamond 118 or change the value as indicated by block 130. Likewise, if the player changed the value as indicated by diamond 108, the player may keep the offer as indicated by diamond 116 or change the multiplier as indicated by block 134. In all other respects, namely that the scheme enables the player to see a maximum of three offers, the two embodiments coincide.

In a further embodiment, the bonus scheme enables the player to change either the value or the multiplier or both multiple times. The implementor determines, in accordance with a game theme and the potential overall payout, the appropriate number of times that the player changes either the value or multiplier. This embodiment also contemplates the implementor determining the order in which a player may change the values and multipliers multiple times in accordance with the above objectives. The embodiment contemplates, in one round, changing both the value and the multiplier sequentially (e.g., value sequences, then multiplier sequences) or simultaneously (e.g., value and multiplier sequence at the same time).

It should be appreciated that the bonus scheme can operate, as described above, without displaying the offer to the player. In this alternative embodiment, the bonus scheme displays only a value and a multiplier, and the player mentally performs the mathematical function to determine an offer. Otherwise, this alternative embodiment operates as described above.

Figure 4:
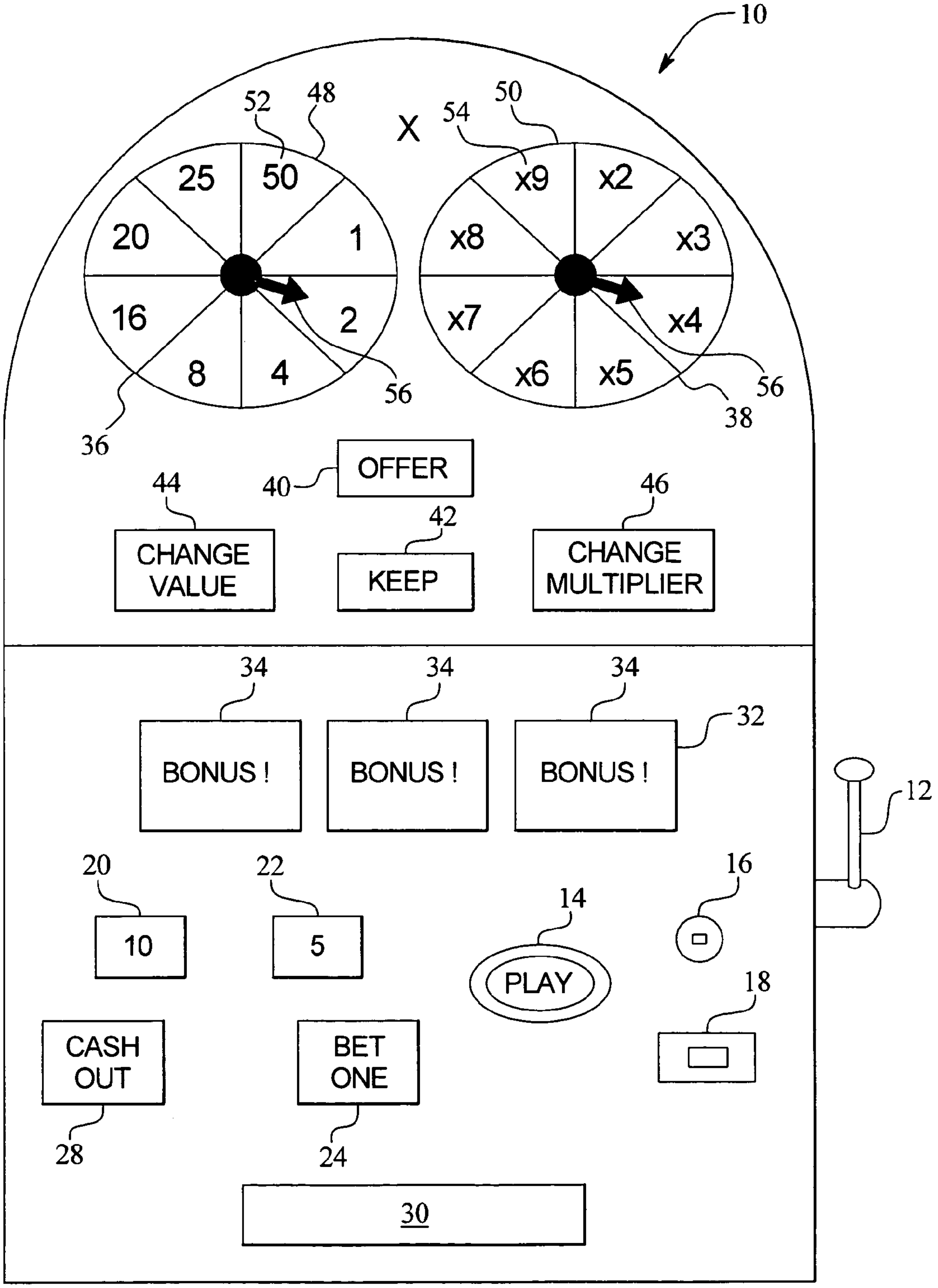
FIG. 4 is a front elevational view of an alternative embodiment of the gaming device or slot machine having a first wheel with a spinning pointer and a plurality of values and a second wheel with a spinning pointer and a plurality of multipliers.

In another embodiment of the present invention, the value display 36 and the multiplier display 38 each consist of a spinning wheel as generally illustrated in FIG. 4. The value wheel is divided into a plurality of wedges 48 that each have one value 52. The multiplier wheel is divided into a plurality of wedges 50 that each have one multiplier 54. Displays 36 and 38 can delineate the wedges, for instance by giving each a different color, or, alternatively, hide the wedges and only show the values and the multipliers. The value 52 and the multiplier 54 are numbers that mathematically relate to a number of credits, wherein the number of credits is within the limit of possible credits for the slot machine 10.

FIG. 4 illustrates both the values 52 and the multipliers 54 incrementing in a clockwise manner about the centers of the displays 36 and 38. Alternatively, they could increment in a counterclockwise manner about the centers 36 and 38, or could be randomly juxtaposed. The displays 36 and 38 could also show a particular value or multiplier more than once.

FIG. 4 illustrates an indicator 56 positioned at the center of each of the displays 36 and 38, wherein the indicators 56 point radially outward. Alternatively, the indicators 56 could be positioned adjacent to the wheels 36 and 38 to indicate a winning position as is well known in the art. To spin, the wedges, values and multipliers preferably remain stationary while the indicators 56 rotate. Alternatively, the indicators 56 could remain stationary while the wheels having the wedges 48 and 50, the values 52, and the multipliers 54 rotate.

Additionally, referring to FIGS. 4 and 6, the displays 36, 38 and 40 can be mechanical or simulated. In the mechanical configuration, the displays can contain light sources that are not shown, such as light bulbs, to illuminate each value, multiplier, or offer, respectively. In the simulated configuration, the displays 36, 38 and 40 are displayed on a video monitor or with a touch screen 25, so that the wedges 48 and 50, the values 52, the multipliers 54, and the indicators 56 are all simulated. The touch screen 25 could also contain the keep offer button or indicator 42, the change value button or indicator 44, and the change multiplier button or indicator 46. The monitor and touch screen 25 contain suitable light sources, well known in the art, to selectively illuminate the above stated items.

Referring to FIGS. 2 and 4, when a bonus triggering event occurs as indicated by block 102, both the indicators of the value display 36 and the multiplier display 38 begin to spin as described above. The game selects and displays the value 52 and the multiplier 54 by stopping the rotation of the indicators 56. At this moment, the indicators 56 point to or otherwise designate the selected value and the selected multiplier. In an embodiment where both indicators can spin simultaneously, the game can stop the rotation of the indicators simultaneously or, alternatively, they could stop one at a time.

When the player pushes the change value button or indicator 44 to change the value, the game preferably spins the indicator of value display 36 for a pre-determined amount of time. When the player pushes the change multiplier button or indicator 46 to change the multiplier, the game preferably spins the indicator of the multiplier display 38 for a pre-determined amount of time. Each time the value 52 or the multiplier 54 changes, the game determines a new offer, and the offer display 40 displays the updated offer.

If at any time while the displays show a value 52, a multiplier 54, and an offer, the player presses the keep offer button 42, the game adds the current offer amount to the player's credits, and updates the total number of credits in the credit display 20. After the bonus scheme updates the player's credits, the bonus round is finished and the player returns to the normal operation of the slot machine as discussed in conjunction with FIG. 1.

In one example of the present embodiment with the preferred sequence, a player playing a slot machine enters a bonus round when a set of reels of the gaming machine displays "BONUS", "BONUS", "BONUS". The value and multiplier wheels spin and eventually settle upon a value and a multiplier. If the multiplier displayed is initially a relatively high number such as the "X8" in FIG. 4, the player most likely keeps the multiplier and determines whether to change the value or keep the offer. If the value displayed is a relatively low number such as "1" in FIG. 4, the player will probably opt for the chance to obtain a higher value and select the change value button or indicator 44. The value wheel spins and eventually settles upon a different value. The player may elect to change the value one more time or keep the current value and offer. Since the player elected to change the value, the preferred embodiment does not enable the player to change the multiplier in the present bonus round. The bonus round ends when it adds the amount of the offer to the player's game credits and returns the player to the normal operation of the slot machine.

Figure 5:
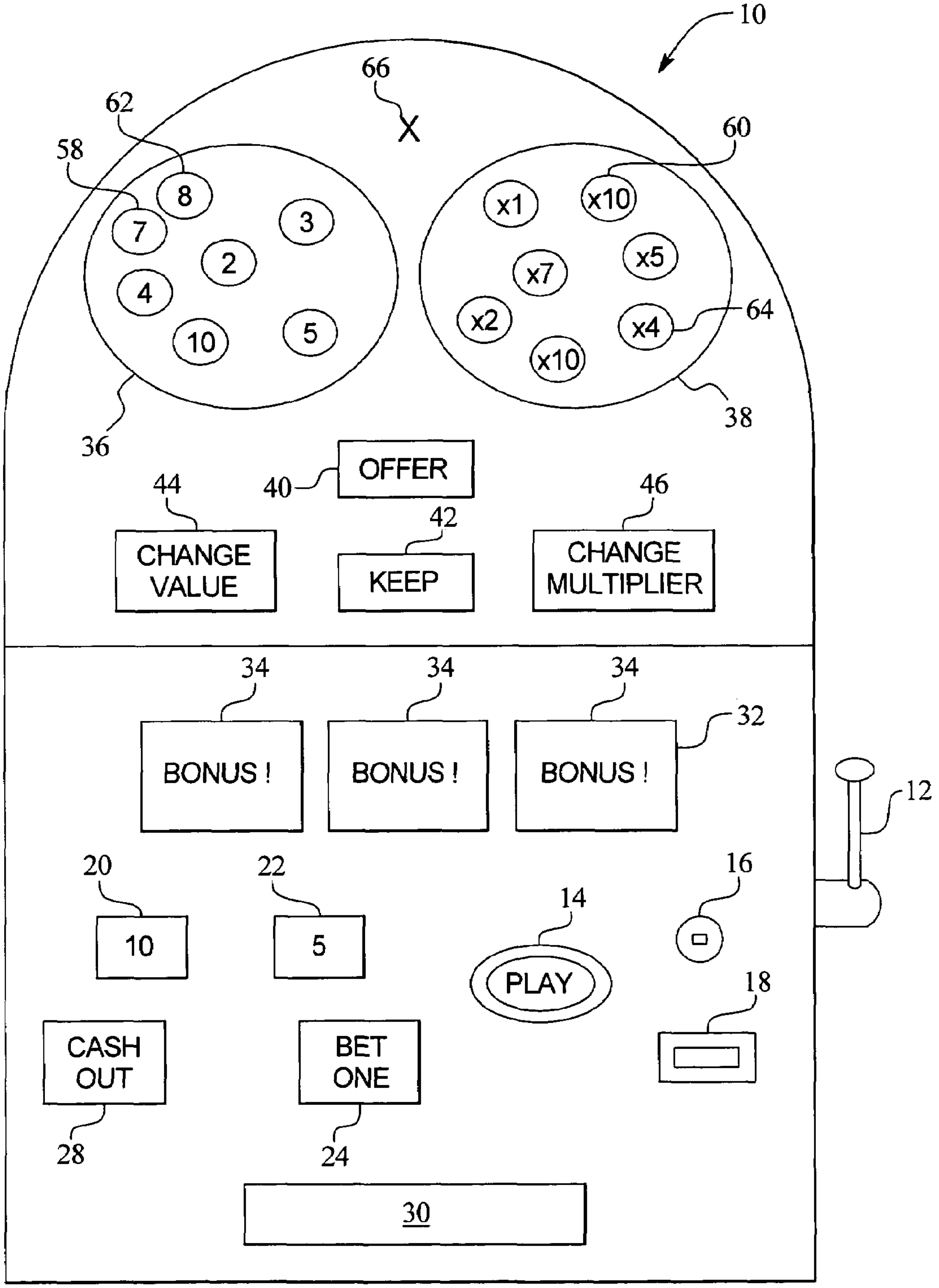
FIG. 5 is a front elevational view of an alternative embodiment of the gaming device or slot machine having displays showing a plurality of separately lightable values and multipliers.

In another embodiment of the present invention, the value display 36 and the multiplier display 38 consist of a plurality of values and multipliers, respectfully, as shown in FIG. 5. The displays may show a particular value or multiplier more than once, and in all cases the values and multipliers mathematically relate to a number of credits, wherein the number of credits is within the limit of possible credits for slot machine 10.

The displays 36 and 38 indicate the selected values and multipliers by illuminating them. The displays illuminate a value 58 and a multiplier 60 or areas 62 and 64, respectively, around them. FIG. 5 shows the areas 62 and 64 as circles although the displays 36 and 38 could contain any suitable shapes or indicators. In one configuration, the displays hide the values and multipliers until they are illuminated. In another, the displays 36 and 38 show the values and multipliers at all times but highlight only the chosen value or multiplier.

As described above, the displays 36, 38, and 40 can be mechanical or simulated. In the mechanical configuration, the displays 36, 38, and 40 contain light sources that are not shown, such as light bulbs, to illuminate each value, multiplier, or offer, respectively. In the simulated configuration, the displays 36, 38 and 40 are displayed on a video monitor or with a touch screen 25, so that the values 58, the multipliers 60 and the areas 62 and 64 are all simulated. The touch screen 25 could also contain the keep offer button or indicator 42, the change value button or indicator 44, and the change multiplier button or indicator 46. The monitor and touch screen 25 contain suitable light sources, well known in the art, to selectively illuminate the above stated items.

Referring to FIGS. 2 and 5, when a bonus round triggering event 102 occurs, both the value display 36 and the multiplier display 38 select a value and multiplier, respectfully, as described above. Preferably, the displays show the player that the game is "thinking" for a period of time, for instance, by lighting randomly selected values and multipliers individually and in a sequence before ultimately making a selection by highlighting the selected value and multiplier. Such a sequence is analogous to the period of spinning in the previous embodiment and can likewise occur simultaneously on both displays or on either display alone. This adds to player excitement and enjoyment.

When the player pushes the change value button or indicator 44 to change the value, the game sequences only the value display 36 before selecting a new value 58. When the player pushes the change multiplier button or indicator 46 to change the multiplier, the game sequences only the multiplier display 38 before selecting a new multiplier 60. Each time the value 58 or the multiplier 60 changes, the game determines a new offer, and the offer display 40 shows an updated offer.

If at any time while the displays show a value 58, a multiplier 60, and an offer, the player presses the keep offer button or indicator 42, the game adds the current offer amount to the player's credits, and updates the total number of credits in the credit display 20. After the bonus scheme updates the player's credits, the bonus round is finished and the player returns to the normal operation of the slot machine as discussed in conjunction with FIG. 1.

In an example of the current embodiment with the preferred sequence, a player playing a slot machine enters a bonus round when a set of reels of the gaming machine displays "BONUS", "BONUS", "BONUS". The separate value and multiplier displays begin to illuminate different values and multipliers in a sequence and eventually settle upon a single illuminated value and multiplier. If the multiplier displayed is a relatively low number such as "2X" in FIG. 4, the player will probably opt for the chance to obtain a higher multiplier and will select the change multiplier button or indicator 46. The multiplier display illuminates different multipliers in a sequence and eventually settles upon a single illuminated multiplier. The player may change the multiplier one more time or keep the current offer.

Alternatively, if the player is less happy with the initially displayed value than the initially displayed multiplier, the player may change the value by hitting the change value button or indicator 44. The value display illuminates different values in a sequence and eventually settles upon a single illuminated value. In the preferred embodiment, the player has one more chance to change the value or otherwise to keep the current offer. If the player uses the two chances (either to change the value or the multiplier), the player does not select the keep offer button; rather, the game automatically adds the amount of the offer to the player's game credits and returns the player to the normal operation of the gaming machine.

As illustrated in FIG. 5, slot machine 10 informs the player of the mathematical function that the bonus scheme 100 performs by placing an appropriate mathematical symbol 66 in an obvious place on the slot machine 10. In addition, the multipliers 54 and 60 may also display the appropriate mathematical symbol as is shown in FIGS. 4 and 5. As mentioned above, the bonus scheme preferably multiplies the multiplier by the value. It should be appreciated that different mathematical functions would significantly alter the dynamics between the bonus scheme and a player's thought process. It is therefore contemplated that the bonus scheme of the present invention could add, subtract, or divide the multiplier to, from, or into the value, respectively. In such case, a modifier would replace the multiplier. Thus, in accordance with the present invention, a modifier employs any mathematical function, including multiplication, which acts upon the value to determine the offer.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device operated under control of a processor, the gaming device comprising:

a display device controlled by the processor;

a plurality of potential offer components adapted to be displayed by the display device;

a first offer determined by the processor from the plurality of potential offer components, said first offer adapted to be displayed by the display device and made to a player; and a second offer determined by the processor from the plurality of potential offer components, said second offer adapted to be displayed by the display device and made to the player wherein one of the components of the second offer is the same as one of the components of the first offer, wherein the second offer is provided to the player after a rejection of the first offer.

2. The gaming device of claim 1, which includes means controlled by the processor for enabling the player to accept or reject the first offer.

3. The gaming device of claim 1, wherein the potential offer components are values and multipliers displayed separately in value and multiplier displays, respectively.

4. The gaming device of claim 1, which includes a third offer made to the player after a rejection of the second offer, wherein said third offer is determined by the processor, said third offer is a combination of the second offer and one of the potential offer components and said third offer is displayed by the display device.

5. The gaming device of claim 4, wherein the third offer is a combination of one of the components of the second offer added to or multiplied by one of the potential offer components.

6. The gaming device of claim 3, wherein the processor is operable to change the first offer using an original multiplier component if an original value component is rejected by the player.

7. The gaming device of claim 3, wherein the processor is operable to change the first offer using an original value component if an original multiplier component is rejected by the player.

8. A gaming device operated under control of a processor, the gaming device comprising:

a plurality of values;

a plurality of multipliers;

means controlled by the processor for displaying to a player an original offer based on a combination of one of the values and one of the multipliers;

means controlled by the processor for enabling the player to accept the original offer; and means controlled by the processor for independently and separately either changing the value or the multiplier of the offer if the player does not accept the offer, wherein a replacement offer using the non-rejected value or non-rejected multiplier is combined with a replacement multiplier or value, respectively, if the player does not accept the original offer.

9. The gaming device of claim 8, wherein the original offer is randomly generated.

10. The gaming device of claim 9, wherein the value of the original offer is displayed by at least one spinning wheel.

11. The gaming device of claim 9, wherein the multiplier of the original offer is displayed by at least one spinning wheel.

12. The gaming device of claim 8, wherein the value changing means includes a display device.

13. The gaming device of claim 8, wherein the multiplier changing means includes a display device.

14. The gaming device of claim 8, wherein the offer providing means includes a display that shows the player the combined offer.

15. A gaming device operated under control of a processor, the gaming device comprising:

a display device controlled by the processor;

a plurality of values adapted to be displayed by the display device;

a plurality of multiplier adapted to be displayed by the display device;

an offer adapted to be displayed by the display device and made to a player, said offer formed by the processor from one of the values and one of the multipliers; and means connected to the processor for enabling the player to accept said offer or to reject said offer by independently rejecting either said value or said modifier which form said offer.

16. The gaming device of claim 15, wherein the display device includes a rotating wheel for displaying each of the values and multipliers, respectively.

17. The gaming device of claim 15, wherein the display device displays the values and multipliers simultaneously or individually.

18. The gaming device of claim 15, wherein the accept/reject offer means includes a change value input.

19. The gaming device of claim 15, wherein the accept/reject offer means includes a change multiplier input.

20. The gaming device of claim 15, wherein the accept/reject offer means includes an accept offer input.

21. The gaming device of claim 15, wherein upon a rejection of the offer, the display device is operable to display a new value or a new multiplier.

22. The gaming device of claim 21, wherein the processor is operable to randomly generate a new value and a new offer based on said new value when the player presses a change value input.

23. The gaming device of claim 22, wherein processor is operable to randomly generate a new multiplier and a new offer based on said new multiplier when the player presses a change multiplier input.

24. A gaming device comprising:

a processor;

a display device controlled by the processor;

a plurality of potential offer components displayed by the display device;

an offer determined by the processor and made to a player from the potential offer components, the offer including an offer component used in a previous offer provided to the player; and means in communication with the processor for enabling the player to accept or reject the made offer.

25. The gaming device of claim 24, wherein the offer includes a multiplication of a new value by a previously used multiplier component.

26. The gaming device of claim 24, wherein the offer includes a multiplication of a new multiplier by a previously used value component.

27. The gaming device of claim 23, wherein the offer includes a new value used in place of a previously rejected value.

28. The gaming device of claim 27, wherein the offer includes a new multiplier used in place of a previously rejected multiplier.

29. The gaming device of claim 27, wherein a previously used component that is used again in the offer continues to be highlighted as a selected component on the display device.

30. The gaming device of claim 29, wherein the display device is operable to highlight a new component combined with the value to form the offer.

* * * * *